(12) United States Patent
Hasti et al.

(10) Patent No.: US 7,543,069 B2
(45) Date of Patent: Jun. 2, 2009

(54) DYNAMICALLY UPDATING SESSION STATE AFFINITY

(75) Inventors: Srinivas Hasti, Raleigh, NC (US); Gabriel Garcia Montero, Chapel Hill, NC (US); Aravind Srinivasan, Raleigh, NC (US); Renganathan Sundararaman, Cary, NC (US); Kevin Edward Vaughan, Fuquay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 10/967,533

(22) Filed: Oct. 18, 2004

(65) Prior Publication Data

US 2006/0085549 A1 Apr. 20, 2006

(51) Int. Cl.
*G06F 15/16* (2006.01)
(52) U.S. Cl. ............... 709/228; 709/217; 709/218; 709/219; 709/229
(58) Field of Classification Search ............... 709/217, 709/218, 219, 227, 228
See application file for complete search history.

(56) References Cited

U.S. PATENT DOCUMENTS

| 6,128,279 | A | 10/2000 | O'Neil et al. ............... 370/229 |
| 6,539,494 | B1 * | 3/2003 | Abramson et al. ............ 714/4 |
| 6,598,077 | B2 * | 7/2003 | Primak et al. ............... 709/219 |
| 7,188,176 | B1 * | 3/2007 | Nedderman et al. ......... 709/227 |
| 7,437,594 | B1 * | 10/2008 | Mount et al. .................. 714/4 |

OTHER PUBLICATIONS

Sadtler, Carla, "Websphere Application Server V5 Architecture," IBM Redbooks Paper, 2003.

"Achieving High Availability and Scalability in Allaire™ Multiserver Environments," *Allaire Clustering White Paper*. Feb. 7, 2000.

"Introduction to KIVA Enterprise Server Security," http://developer.netscape.com/docs/manuals/appserv/2_1/pgscrit1.htm, copyright 1996, 1997.

"Key Components of the KIVA Enterprise Server," http://developer.netscape.com/docs/manuals/appserv/2_1/inover3.htm, copyright 1996, 1997.

(Continued)

*Primary Examiner*—William C Vaughn, Jr.
*Assistant Examiner*—Djenane M Bayard
(74) *Attorney, Agent, or Firm*—Stevens & Showalter LLP

(57) ABSTRACT

Session state affinity is maintained in a workload balancing system that includes a hypertext transfer protocol (HTTP) routing server and a plurality of application servers. The application servers maintain backup session state information for a first session to a first server of the plurality of application servers at fewer than all of the plurality of application servers, detect the unavailability of the first application server at an application server of the plurality of application servers other than the first application and determine a second server that continues the first session. An identification of the second server and the first session is sent from an application server of the plurality of application servers to a HTTP routing server responsive to detecting the unavailability of the first server. The identification of the second server and the first session is received at the HTTP routing server and communications associated with the first session are routed from the HTTP routing server to the second server responsive to receiving the identification of the second server so that backup session state information maintained at the second server is used to continue the first session from the first server at the second server.

5 Claims, 8 Drawing Sheets

OTHER PUBLICATIONS

"Assigning your own session IDs," http://developer.netscape.com/docs/manuals/appserv/2_1/pgstate7.htm, copyright 1996, 1997.

"Key Features of the KIVA Enterprise Server," http://developer.netscape.com/docs/manuals/appserv/2_1/inover2.htm, copyright 1996, 1997.

"Using Persistent Sessions and State Nodes," http://developer.netscape.com/docs/manuals/appserv/2_1/pgstate9.htm, copyright 1996, 1997.

"Using the State Layer," http://developer.netscape.com/docs/manuals/appserv/2_1/pgstate8.htm, copyright 1996, 1997.

"Starting a Session," http://developer.netscape.com/docs/manuals/appserv/2_1/pgstate2.htm, copyright 1996, 1997.

"What is a Session?" http://developer.netscape.com/docs/manuals/appserv/2_1/pgstate1.htm, copyright 1996, 1997.

"About Role Authentication," http://developer.netscape.com/docs/manuals/appserv/2_1/pgscrit3.htm, copyright 1996, 1997.

"About Access Control List Authorization," http://developer.netscape.com/docs/manuals/appserv/2_{13} 1/pgscrit4.htm, copyright 1996, 1997.

"Removing a Session and Its Related Data," http://developer.netscape.com/docs/manuals/appserv/2_1/pgstate4.htm, copyright 1996, 1997.

\* cited by examiner

DYNAMICALLY UPDATING SESSION STATE AFFINITY

FIELD OF THE INVENTION

The present invention relates to workload distribution among data processing systems and more particularly to maintaining session state affinity in systems having multiple application servers.

BACKGROUND OF THE INVENTION

The Internet Protocol ("IP") is designed as a connectionless protocol. Therefore, IP workload balancing solutions typically treat every Transmission Control Protocol ("TCP") connection request to a particular application, identified by a particular destination IP address and port number combination, as independent of all other such TCP connection requests. Examples of such IP workload balancing systems include Sysplex Distributor from the International Business Machines Corporation ("IBM"), which is included in IBM's z/OS and OS/390 TCP/IP implementations, and the Multi-Node Load Balancer ("MNLB") from Cisco Systems, Inc. Workload balancing solutions such as these use relative server capacity (and, in the case of Sysplex Distributor, also network policy information and quality of service considerations) to dynamically select a server to handle each incoming connection request. However, some applications require a relationship between a particular client and a particular server to persist beyond the lifetime of a single interaction (i.e. beyond the connection request and its associated response message).

Web applications are one example of applications that require ongoing relationships. For example, consider a web shopping application, where a user at a client browser may provide his user identifier ("user ID") and password to a particular instance of the web application executing on a particular server and then shops for merchandise. The user's browser may transmit a number of separate—but related—Hypertext Transfer Protocol ("HTTP") request messages, each of which is carried on a separate TCP connection request, while using this web application. Separate request messages may be transmitted as the user browses an on-line catalog, selects one or more items of merchandise, places an order, provides payment and shipping information, and finally confirms or cancels the order. In order to assemble and process the user's order, it may be necessary to maintain state information (such as the user's ID, requested items of merchandise, etc.) until the shopping transaction is complete. It may, therefore, be necessary to route all of the related connection requests to the same application instance because this state information exists only at that particular web application instance. Thus, the workload balancing implementations typically must account for on-going relationships of this type and subject only the first connection request to the workload balancing process.

Another example of applications that require persistent relationships between a particular client and a particular server is an application in which the client accesses security-sensitive or otherwise access-restricted web pages. Typically, the user provides his ID and password on an early connection request (e.g. a "log on" request) for such applications. This information must be remembered by the application and carried throughout the related requests without requiring the user to re-enter it. It is therefore necessary to route all subsequent connection requests to the server application instance which is remembering the client's information. The workload balancing implementation must therefore bypass its normal selection process for all but the initial one of the connection requests, in order that the on-going relationship will persist.

The need to provide these persistent relationships is often referred to as "server affinity" or "the sticky routing problem". One technique that has been used in the prior art to address this problem for web applications is the use of "cookies". A "cookie" is a data object transported in variable-length fields within HTTP request and response headers. A cookie stores certain data that the server application wants to remember about a particular client. This could include client identification, parameters and state information used in an on-going transaction, user preferences, or almost anything else an application writer can think of to include. Cookies are normally stored on the client device, either for the duration of a transaction (e.g. throughout a customer's electronic shopping interactions with an on-line merchant via a single browser instance) or permanently. A web application may provide identifying information in the cookies it transmits to clients in response messages, where the client then returns that information in subsequent request messages. In this manner, the client and server application make use of connection-oriented information in spite of the connection-less model on which HTTP was designed.

Through the use of cookies, server affinity may be maintained for a session with a client. Furthermore, because server affinity may be maintained, the server may maintain state information for a session with a client. A backup server may also maintain the state information for the session for use in the event of unavailability of the original server. However, while server affinity may be maintained for the session, if the original server fails it may be difficult to route requests for the session to the correct backup server, especially if the backup server is a specific server in a group of servers and is not statically defined or may vary for different sessions to the original server.

For example, in WebSphere Application Server v. 5, HTTP routing servers may route communications for a session to a first application server based on an identification of a specific server in the communications. Other application servers in a cluster of application servers may maintain backup session state information for the session to the first application server. If the first application server fails, one of the other application servers in the cluster continues the session using the backup session state information. The backup server utilized may be selected statically, i.e. a specific one of the application servers that is established in a static configuration, or dynamically, i.e. selected on-the-fly at the time of failure of the first application server. In the situation where the backup application server is selected dynamically by the cluster of application servers, the HTTP routing server may not know which application server has been selected and, using a server to IP address table, look up the failed server as the destination to forward communications. Furthermore, the problem may become even more complex if multiple sessions are continued by different backup application server, which may be the case to maintain load balancing, and if multiple HTTP routing servers are used as the identity of the backup application server for a session may be difficult to establish a priori so that the routing application servers could be preconfigured with the backup information.

SUMMARY OF THE INVENTION

Some embodiments of the present invention provide methods, systems and/or computer program products for maintaining session state affinity in a workload balancing system that includes a hypertext transfer protocol (HTTP) routing server and a plurality of application servers. The application servers maintain backup session state information for a first session to a first server of the plurality of application servers at fewer than all of the plurality of application servers, detect the unavailability of the first application server at an application server of the plurality of application servers other than the first application and determine a second server that continues the first session. An identification of the second server and the first session is sent from an application server of the plurality of application servers to a HTTP routing server responsive to detecting the unavailability of the first server. The identification of the second server and the first session is received at the HTTP routing server and communications associated with the first session are routed from the HTTP routing server to the second server responsive to receiving the identification of the second server so that backup session state information maintained at the second server is used to continue the first session from the first server at the second server.

In further embodiments of the present invention, sending an identification of the second application server includes incorporating the identification of the second application server and the first session in a response associated with a second session different from the first session. Furthermore, the HTTP routing server may receive the response associated with the second session, strip the identification of the second server from the response associated with the second session and forward the response stripped of the identification.

In additional embodiments of the present invention, the HTTP routing server requests an identification of associations of application servers and sessions from the application servers. An identification of associations of application servers and sessions is sent from any of the application servers to the HTTP routing server responsive to the request from the HTTP routing server. Additionally, it may be determined if an identification of associations of application servers and sessions at the HTTP routing server is out of date and the HTTP routing server request an identification of associations of application servers and sessions responsive to the determination that the identification of associations of application servers and sessions at the HTTP routing server is out of date.

In particular embodiments of the present invention where servers are grouped into partitions, the identification of associations of application servers and sessions includes a partition to server mapping table maintained by the HTTP routing server. The use of a partition may provide a level of abstraction that allows a client to use the same partition identification irrespective of the particular server mapped to the partition. This may help reduce timing issues when a session is continued at a backup server.

In additional embodiments of the present invention, a system for maintaining session affinity to servers includes a HTTP routing server that includes a partition to server mapping table configured to associate sessions with application servers and a server to Internet Protocol (IP) address mapping table configured to associate an application server with an IP address. The HTTP routing server is configured to receive communications from an application server, strip partition to server mapping table information from the received communication, update the partition to server mapping table with the stripped information and forward the stripped communication.

The HTTP routing server may be further configured to request partition to server mapping table information from the application servers, receive updated partition to server mapping table information from the application servers responsive to the request and update the partition to server mapping table with the received partition to server mapping table information. The HTTP routing server may also be configured to request partition to server mapping table information if it is determined that the partition to server mapping table is not up to date. The HTTP routing server may be configured to request partition to server mapping table information upon initialization.

In additional embodiments of the present invention, the HTTP routing server is further configured to receive a communication to one of the application servers, determine a partition associated with the received communication, identify a server based on the determined partition and utilizing the partition to server mapping table, identify an IP address for the identified server using the server to IP address mapping table and forwarding the received communication to the identified IP address. The HTTP routing server may be further configured to determine if the partition to server mapping table is out of date and, if the partition to server mapping table is out of date, store the received communication, request partition to server mapping table information from the application servers, receive updated partition to server mapping table information from the application servers responsive to the request, update the partition to server mapping table with the received partition to server mapping table information and forward the stored request using the updated partition to server mapping table.

In additional embodiments of the present invention where a partition is associated with a session, the system includes an application server configured to incorporate mapping information of partitions to servers in a communication routed to the HTTP routing server. The mapping information may be incorporated in an HTTP response, for example, as a cookie or in a header of a message, routed to the HTTP routing server.

Further embodiments of the present invention provide methods, system and/or computer program products for updating routing information in a cluster computing environment that maintains state information for sessions to servers in a cluster of servers by piggybacking routing information associated with a first session on a communication from a server in the cluster of servers to a HTTP routing server associated with the cluster of servers. The communication on which the routing information is piggybacked is associated with a second session different from the first session.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
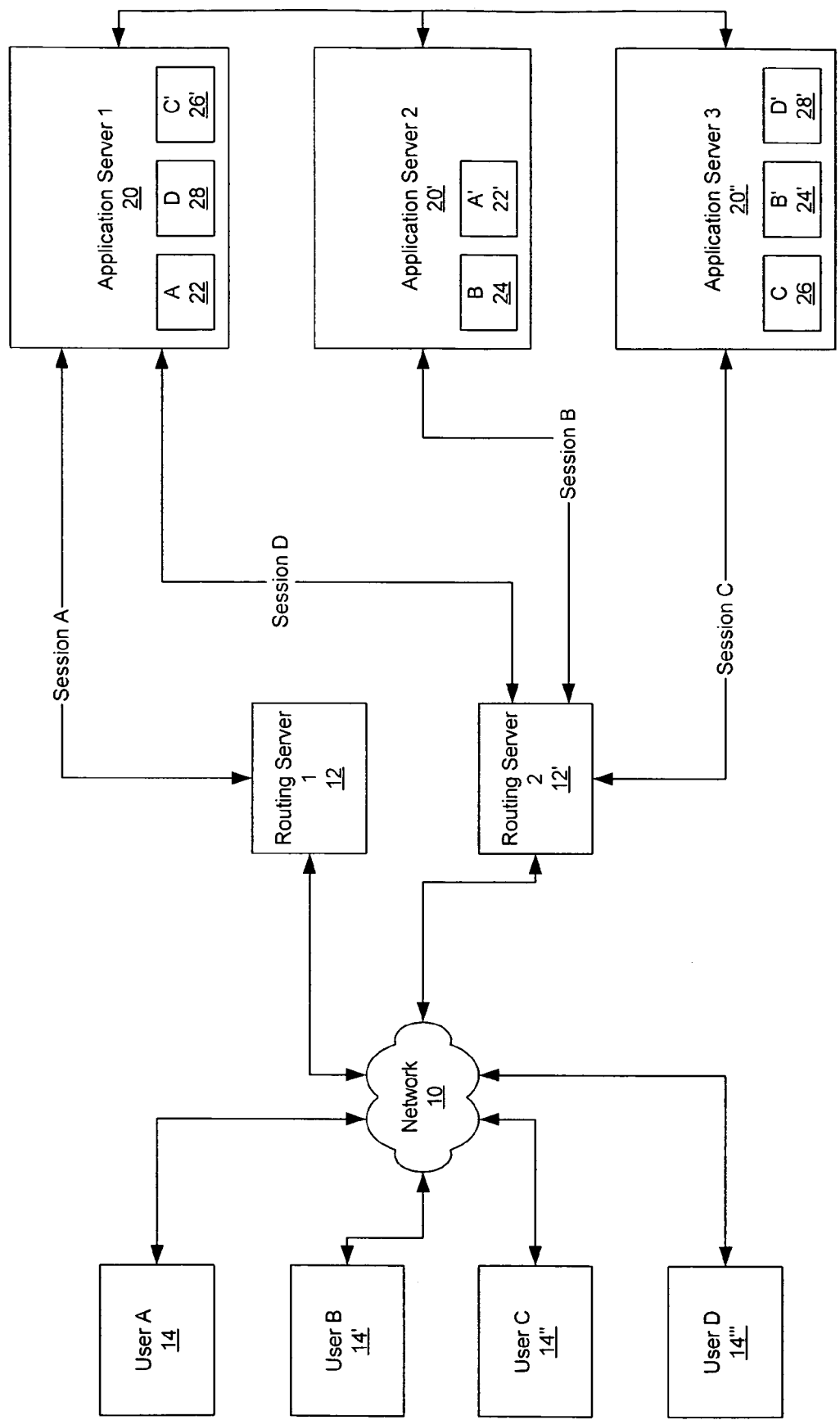
FIG. 1 is a block diagram of a system incorporating some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items and may be abbreviated by "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems and/or computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1 through 7. FIG. 1 is a diagram of a system incorporating some embodiments of the present invention for maintaining session state affinity. As seen in FIG. 1, a plurality of users 14, 14', 14" and 14'" communicate over a network 10 with particular ones of a plurality of application servers 20, 20' and 20" through HTTP routing servers 12 and 12'. Each of the plurality of users 14, 14', 14" and 14'" may have one or more sessions with one or more of the application servers 20, 20' and 20". Thus, for example, FIG. 1 illustrates a session A for user A 14 with application server 1 20, a session B for user B 14' with application server 2 20', a session C for user C 14" with application server 3 20" and a session D for user D 14'" with application server 1 20. The assignment of sessions to particular ones of the application servers 20, 20' and 20" may be provided, for example, by a workload management function (not shown) with which the application servers 20, 20' and 20" have registered. For example, in embodiments of the present invention where the application servers 20, 20' and 20" are WebSphere Application Servers (WAS), the application servers 20, 20' and 20" may be a group of application servers registered with the HTPP plug-in that provides the WAS Work Load Management (WLM) capability.

The application servers 20, 20' and 20" maintain session state information for sessions with the particular application server 20, 20' and 20". For example, Application server 1 20 maintains session state information A 22 for session A and session state information D 28 for session D. Application server 2 20' maintains session state information B 24 for session B. Application server 3 20" maintains session state information C 26 for session C.

The application servers 20, 20' and 20" also maintain backup session state information to take over a session in the event that the original application server becomes unavailable. The backup session state information is maintained at a designated one of the application servers 20, 20' and 20". For example, as seen in FIG. 1, application server 1 20 maintains backup session state information C' 26' for session C. Application server 2 20' maintains backup session state information A' 22' for session A. Application server 3 20" maintains backup session state information B' 24' for session B and backup session state information D' 28' for session D.

Note that the backup session state information is not distributed to each of the application servers 20, 20' and 20" or stored in a common storage accessible to each of the application servers 20, 20' and 20" but rather is maintained at a designated one or subset of less than all of the application servers 20, 20' and 20". In the event of unavailability of one of the application servers 20, 20' and 20" the remaining ones of the application servers 20, 20' and 20" are notified of the unavailability and the designated backup server takes over the sessions for which it is designated using the corresponding backup session state information. The maintenance of a backup copy of session state information at a designated backup server and the notification of the unavailability of one of the application servers 20, 20' and 20" to the remaining ones of the application servers 20, 20' and 20" may be provided, for example, as provided by WebSphere Application Server, V. 5 from International Business Machines, Inc. of Armonk, N.Y., or other suitable techniques known to those of skill in the art. For example, session state information may be maintained at multiple servers in a group of servers registered with WAS WLM and the detection and notification of an unavailable server may be provided by the WAS High Availability Manager which is provided by WebSphere Application Server V. 6. The maintenance of a backup copy of session state information and the notification of the unavailability of an application server is beyond the scope of the present invention and, accordingly, need not be described further herein.

In some embodiments of the present invention, however, upon failure of a primary server, the backup server(s) notify the HTTP routing servers 12 and 12' of the sessions which it is to continue so that the HTTP routing servers 12 and 12' may route subsequent requests for the continued sessions to the designated backup server. The HTTP routing servers 12 and 12' maintain information as to a currently designated server associated with particular sessions routed by the HTTP routing servers 12 and 12'. The routing information maintained by the HTTP routing servers 12 and 12' is updated when the HTTP routing servers 12 and 12' are notified that a backup application server has taken over a session and route subsequent communications associated with the session using the updated information. Furthermore, in some embodiments, the HTTP routing servers 12 and 12' determine if the routing information they have is current and, if not, request current information from the application servers 20, 20' and 20". Such an approach may be independent of whether a single or multiple sessions are associated with a particular user or whether multiple users have multiple sessions.

In some embodiments of the present invention, the applications servers 20, 20' and 20" are servers in a cluster of servers and may, for example, be a cluster of WebSphere application servers. Furthermore, the users 14, 14', 14" and 14''' may be any device capable of establishing a session with the application servers 20, 20' and 20". For example, the users 14, 14', 14" and 14''' may be a wired and/or wireless network enabled device and may execute a browser or other software capable of communicating over a network and establishing a session. Furthermore, the network 10 may be a wired and/or wireless network, the Internet and/or an intranet or other suitable network for allowing a session to be established between a user and a server.

Figure 2:
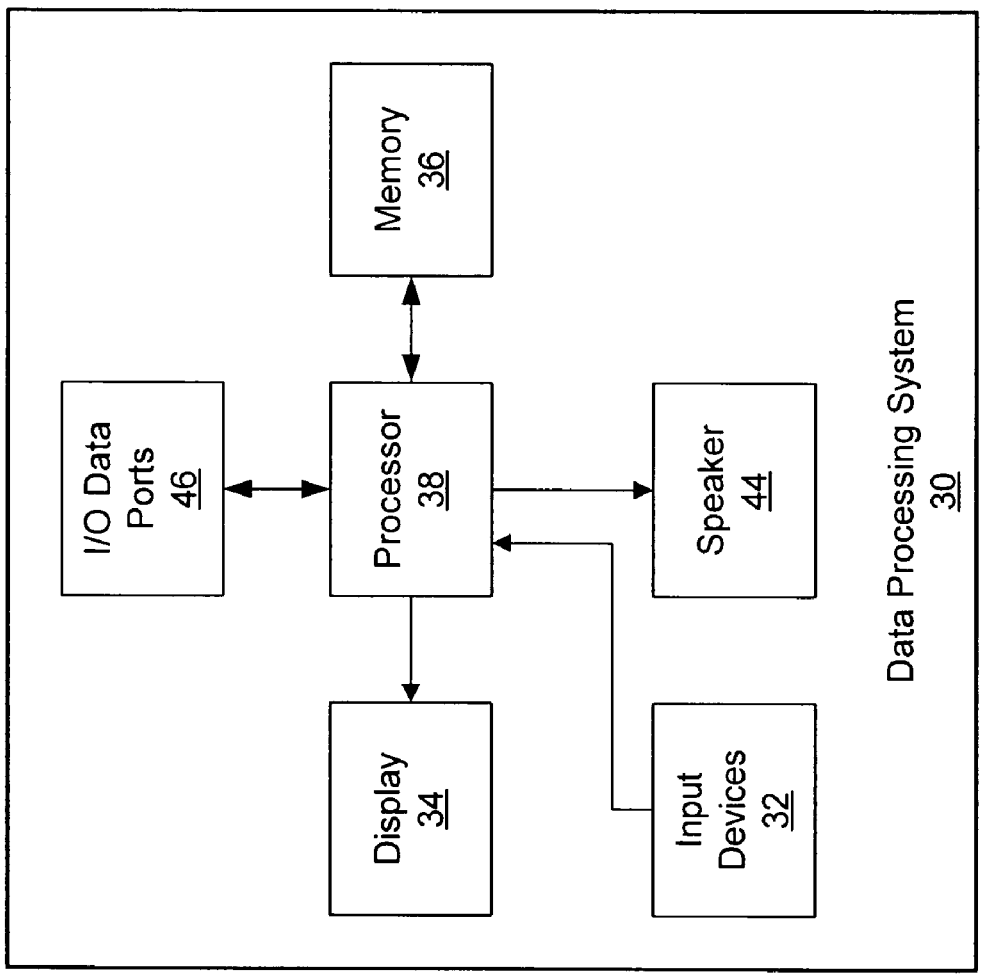
FIG. 2 is a block diagram of a data processing system suitable for use as an application server or a HTTP routing server according to some embodiments of the present invention.

Referring now to FIG. 2, a block diagram of data processing systems suitable for use as a HTTP routing server and/or an application server in systems according to some embodiments of the present invention will be discussed. As illustrated in FIG. 2, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 3:
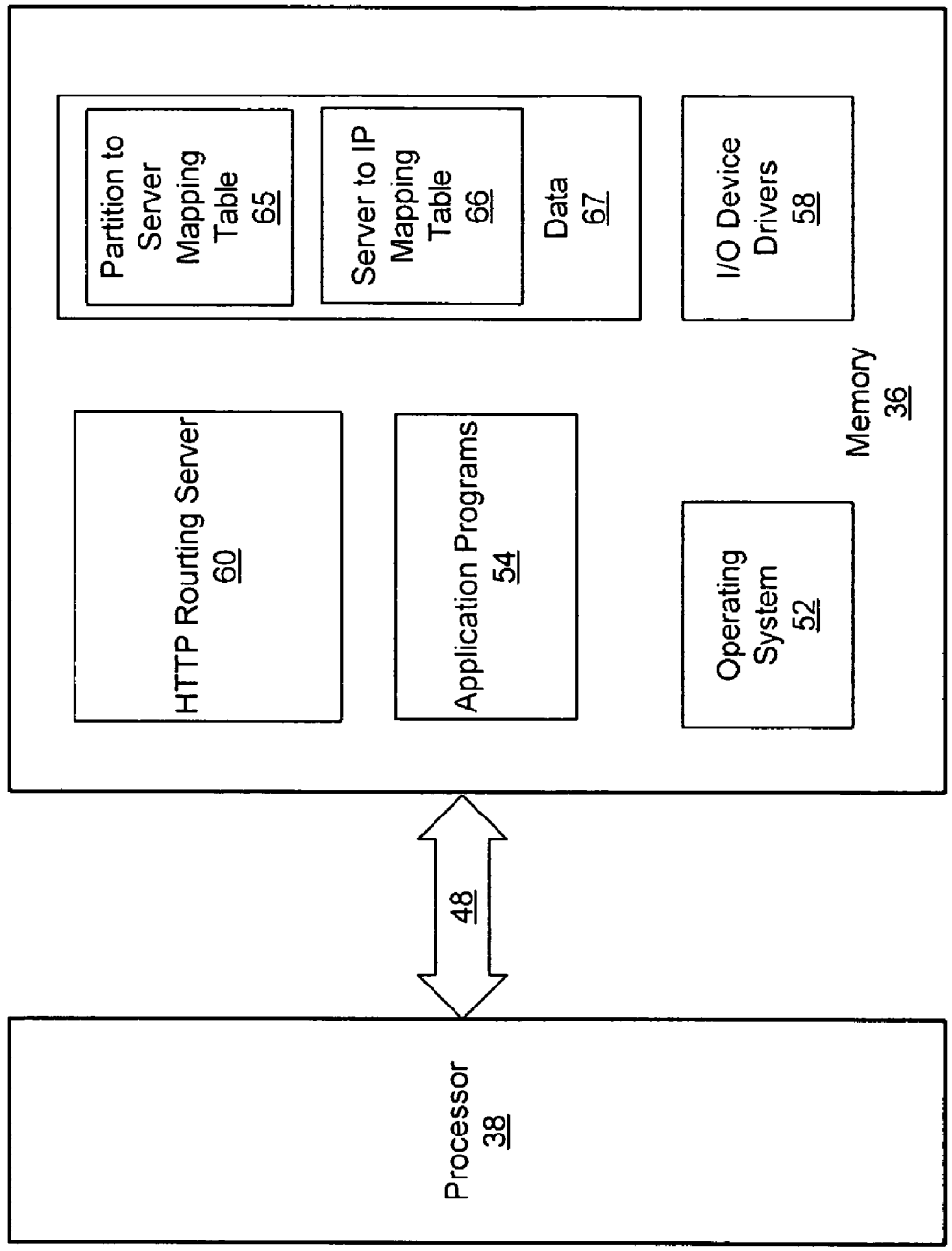
FIG. 3 is a block diagram of a data processing system for providing a HTTP routing server incorporating some embodiments of the present invention.
Figure 4:
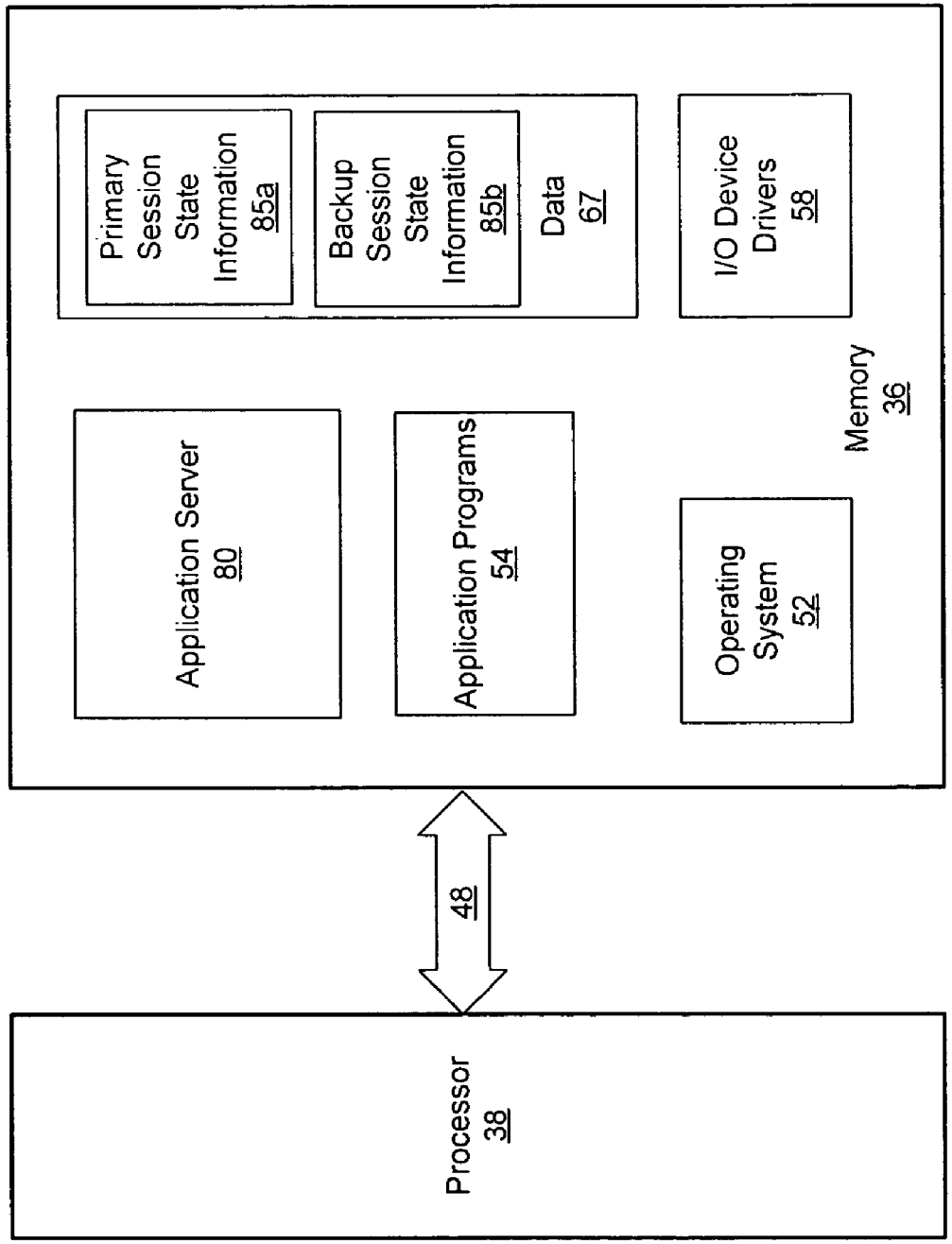
FIG. 4 is a block diagram of a data processing system for providing an application server incorporating some embodiments of the present invention.

FIGS. 3 and 4 are block diagrams of data processing systems that illustrate systems, methods, and/or computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIGS. 3 and 4, the memory 36 may include several categories of software and data used in the data processing system 30: the operating system 52; the application programs 54; the input/output (I/O) device drivers 58; and the data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 67 represents the static and dynamic data used by the application programs 54, the operating system 52, the I/O device drivers 58, and other software programs that may reside in the memory 36.

As is further seen in FIG. 3, the application programs 54 may include one or more HTTP routing servers 62. The data portion 67 of memory 36, as shown in the embodiments illustrated in FIG. 3, may include a partition to server mapping table 65 and a server to IP mapping table 66 used by the HTTP server 62 to route requests to the application servers 80. The groups of application servers may be divided into partitions and a partition identification associated with each partition. A session to an application server may be associated with a partition. The identification of the server for a communication may then be made by identifying the partition associated with the communication, which may, for example, be supplied by the client as part of a cookie, looking up the partition in the partition to server mapping table 65 to identify a server and then looking up the IP address of the server in the server to IP mapping table 66. Thus, the partition identification provides a layer of abstraction where the server that communications are sent to may be changed even though the client does not change the partition identified in its communications by changing the partition to server mapping table 65 in the HTTP routing server 62.

As is further seen in FIG. 4, the application programs 54 may include multiple application servers 80. The application servers 80 may include a web container component configured to communicate with the HTTP routing servers 62 as described herein. The data portion 67 of memory 36, as shown in the embodiments illustrated in FIG. 4, may include primary session state information 85*a* for a given application server 80 which may store session state information for sessions to the application server 80 and backup session state information 85*b* for other application servers for which the application server 80 is a backup server.

While embodiments of the present invention have been illustrated in FIGS. 3 and 4 with reference to particular divisions between application programs, data and the like, the present invention should not be construed as limited to the configurations of FIGS. 3 and 4 but is intended to encompass any configuration capable of carrying out the operations described herein. Furthermore the functionality described herein may be provided, for example by plug-ins or other ancillary code to provide functionality to existing applications. Furthermore, certain embodiments of the present invention are provided as part of a WebSphere Application Server system, such as that described in the IBM Redbooks Paper entitled WebSphere Application Server V5 Architecture, 2003. Thus, for example, the HTTP routing server may be provided as a WebSphere workload management plug-in to an HTTP server and the application servers may be provided by clustering application servers that host Web containers and/or EJB containers.

Figure 5A:
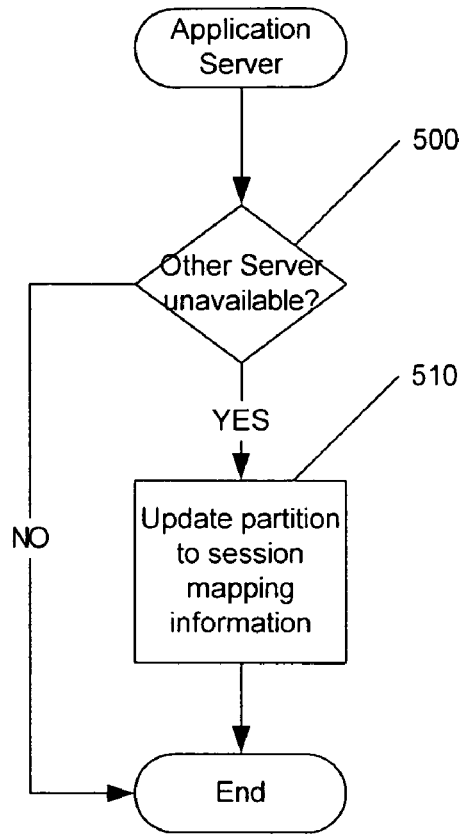
FIGS. 5A, 5B and 5C are flowcharts illustrating operations of an application server according to some embodiments of the present invention.

FIG. 5A illustrates operations of an application server, such as the application servers 20, 20' and 20" of FIG. 1 or 80 of FIG. 4, according to some embodiments of the present invention. As seen in FIG. 5A, if another server is not unavailable (block 500), operation of the application server continues. If, however, another application server is unavailable (block 500), the application server updates its mapping of partitions to servers for sessions with the unavailable server to reflect that the sessions are continued at the backup servers for the sessions (block 510). The determination that another server is unavailable may, for example, be made by receiving notification of the unavailability from an error detection function or service, such as the WAS High Availability Manager function as described above.

Figure 5B:
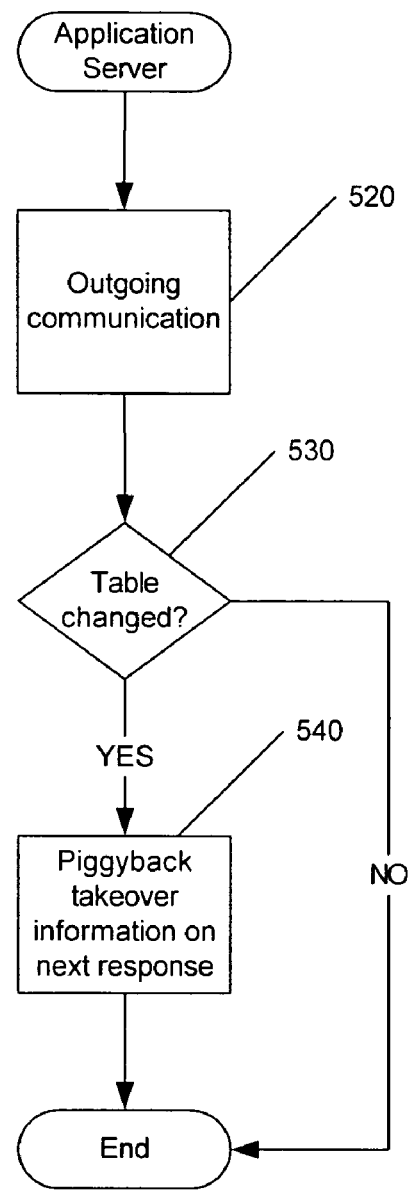

FIG. 5B illustrates operations of an application server in sending HTTP communications from the application server, such as the application servers 20, 20' and 20" of FIG. 1 or 80 of FIG. 4, according to some embodiments of the present invention. When the application server has an outgoing communication to send (block 520), the application server determines if the partition to mapping table has been updated since the last message was sent (block 530). If the partition mapping information has not been updated (block 530), then operations may continue. However, if the partition to server mapping information has been updated (block 530), then the application server adds information to subsequent responses sent through the HTTP routing servers (i.e. "piggybacks" the information on a response) to indicate the sessions that the application server has taken over as backup for the unavailable server (block 540). The new session information may, for example, be included in a cookie or a header sent with a next response provided by the application server. In some embodiments of the present invention, the information is piggybacked on a next subsequent message after the partition to server mapping information is updated. A variable, flag or other indicator that the mapping information has been updated could then be reset. In other embodiments of the present invention, the information may be piggybacked on several subsequent responses to the HTTP routing servers. The information may be included in a response for a session other than a session that is being taken over by the application server. Furthermore, the information may be provided as an update to or an updated partition to server mapping table that is used by the HTTP routing server to select a server associated with a particular session.

As an example, in the system illustrated in FIG. 1, if application server 3 20" becomes unavailable, application server 1 20 and application server 2 20' are notified of the unavailability of application server 3 20". The application server 1 20 has the backup session state information C' 26' for session C and, therefore, will continue the session C with the user C 14". To notify the HTTP routing server 2 12' that application server 1 20 has taken over session C, the application server 1 20 and/or the applciation server 2 20' incorporates into a subsequent response, such as a response to a request for session D, information indicating that subsequent communications for session C are to be routed to application server 1 20. This notification may, for example, be provided by incorporating in a cookie or header of a subsequent communication a revised partition to server mapping table that the HTTP routing server 2 12' would then use for routing communications as described in further detail below.

Figure 5C:
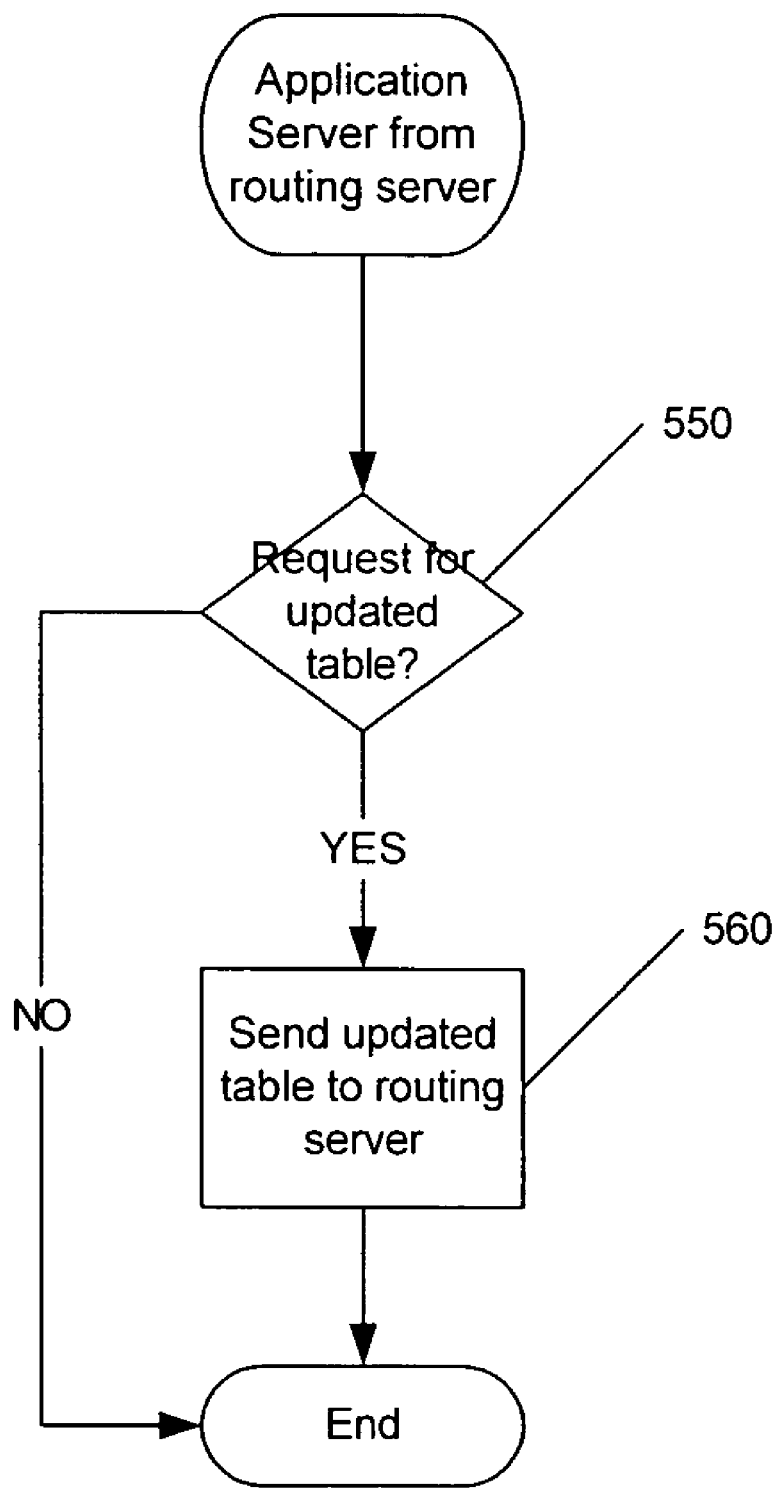

While the operations illustrated in FIGS. 5A and 5B may be sufficient to provide information to HTTP routing servers 12 and 12' of FIG. 1 or 60 of FIG. 3 in many situations, if a request is received for a session to an unavailable server before the backup server has identified itself to the HTTP routing servers 12 and 12' of FIG. 1 or 60 of FIG. 3, the HTTP routing servers 12 and 12' of FIG. 1 or 60 of FIG. 3 may incorrectly route the request to the incorrect application server. FIG. 5C provides operations of the applications servers that allow the HTTP routing servers 12 and 12' of FIG. 1 or 60 of FIG. 3 to proactively obtain routing information. Such a proactive request for routing information may, for example, occur upon initial operation of a HTTP routing server or, as illustrated in FIG. 6, when a HTTP routing server determines that it has an out of date partition to server mapping table.

As seen in FIG. 5C, when the application servers 20, 20' and 20" of FIG. 1 or 80 of FIG. 4 receive a communication from one of the HTTP routing servers 12 and 12' of FIG. 1 or 60 of FIG. 3, they determine if the communication includes a request for an updated partition to server mapping table (block 550). Such requests may be provided, for example, by a dedicated communication between the HTTP routing servers 12 and 12' of FIG. 1 or 60 of FIG. 3 and the application servers 20, 20' and 20" of FIG. 1 or 80 of FIG. 4 or may be piggybacked on other communications from the HTTP routing servers 12 and 12' of FIG. 1 or 60 of FIG. 3 to the application servers 20, 20' and 20" of FIG. 1 or 80 of FIG. 4. However, to provide for initialization of the HTTP routing servers 12 and 12' of FIG. 1 or 60 of FIG. 3, the use of a dedicated communication for requesting the partition to server mapping table may be more efficient than piggybacking the request on other communications. Furthermore, if the requests from the HTTP routing server is piggybacked on an existing communication, the application servers would need to analyze the received communications and strip the piggybacked request in a manner analogous to that described below with reference to the HTTP routing servers.

If the communication does not include a request for an updated table (block 530), the application servers process the communication in a conventional manner. If, however, the communication includes a request for an updated partition to server mapping table (block 550), the application server sends the updated table to the HTTP routing server (block 560). For example, the updated table may be sent as a dedicated response to a request from the HTTP routing server. In alternative embodiments, the updated table may be piggybacked on a subsequent communication for a session to the application server that is routed through the requesting HTTP routing server. Alternatively, the response could be broadcast to all HTTP routing servers.

Figure 6:
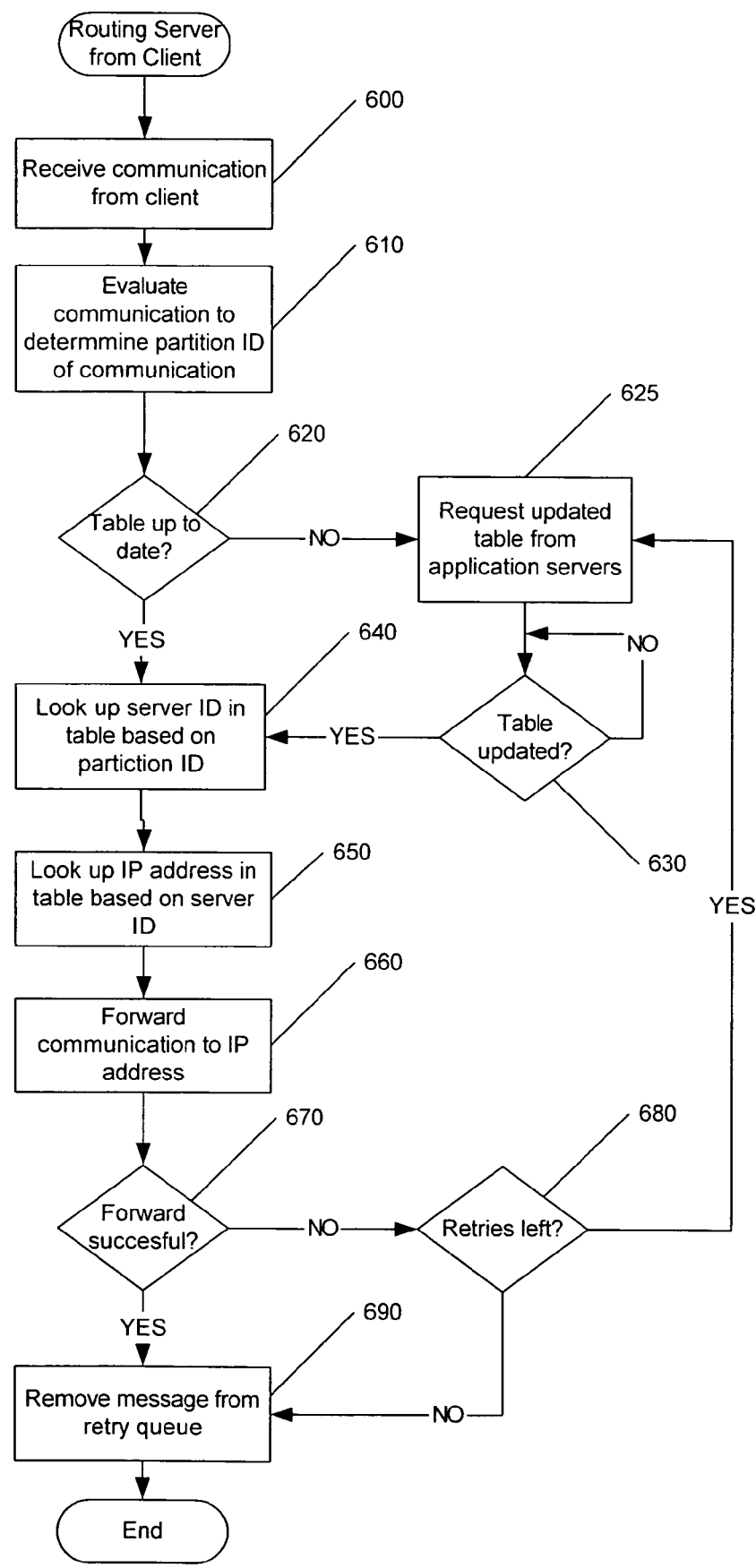
FIGS. 6 and 7 are flowcharts illustrating operation of a HTTP routing server according to some embodiments of the present invention.

FIG. 6 illustrates operations of a HTTP routing server, such as the HTTP routing servers 12 and 12' of FIG. 1 or 60 of FIG. 3, according to some embodiments of the present invention. As seen in FIG. 6, the HTTP routing server, such as HTTP routing server 12 or 12' of FIG. 1 or 60 of FIG. 3, receives a communication from a client associated with a user, such as users 14, 14', 14" or 14'" (block 600). The HTTP routing server evaluates the communication to determine a partition identification (partition ID) associated with the communication (block 610). The partition ID may be incorporated into a cookie included with the communication and may be any suitable designator for identifying the server associated with the communication.

Optionally, the HTTP routing server determines if the partition to server mapping table is current (block 620) and if not, stores the communication and sends a request to the application servers for an updated partition to server mapping table (block 625). The HTTP routing server then waits to receive the updated table from an application server (block 630). The HTTP routing server may determine that the partition to server mapping table is not current by, for example, use of a time stamp on the partition to server mapping table. The time stamp of the table may be used to determine if the validity of the table has aged out. The communication sent to the application servers requesting an updated table may be provided as described with reference to FIG. 5C.

In any event, after an updated table is received from the application servers, the HTTP routing server looks up the server in the partition to server mapping table based on the partition identification of the communication to determine the server associated with the communication (block 640). The partition to server mapping table indicates the server with the session state information associated with the communication and, therefore, by looking up the server in the partition to server mapping table, the server associated with a session may be changed so that the HTTP routing server may send the communication to the current primary server for the session associated with the communication. The HTTP routing server also looks up an IP address of the identified server in a server to IP address mapping table (block 650) and forwards the communication to the identified IP address (block 660).

Returning to block 620, if the partition to server mapping table is current (block 620), the HTTP routing server looks up the server in the partition to server mapping table based on the partition identification of the communication to determine the server associated with the communication (block 640). The HTTP routing server then looks up an IP address of the identified server in a server to IP address mapping table (block 650) and forwards the communication to the identified IP address (block 660).

If forwarding the communication is successful (e.g., a response is received to forwarding the communication) (block 670), the communication is removed from being stored for retries (block 690) and operations are complete. If forwarding the communication is not successful (e.g., no response is received to the communication) (block 670), it is determined if forwarding the request should be retried (block 680). This determination may be made, for example, by keeping a retry count and seeing if a maximum number of retries for a communication has been exceeded or would be exceeded by another retry. If retries are left for the communication (block 680), operations continue from block 625 by requesting an updated table from the application servers to obtain information to use for the retry. Thus, the HTTP routing server may determine that the mapping table is not current and needs to be updated by whether forwarding a communication is successful.

As discussed above, the HTTP routing server may optionally track whether a response to a communication to the application servers receives a response from the application servers to determine if the partition to server mapping table is current. If no response is received, the HTTP routing server could request an updated partition to server mapping table for use in subsequent communications. Optionally, if a change in the mapping for the partition associated with the communication is indicated in the updated partition to server mapping table, the routing sever may resend the communication to the newly identified server.

Figure 7:
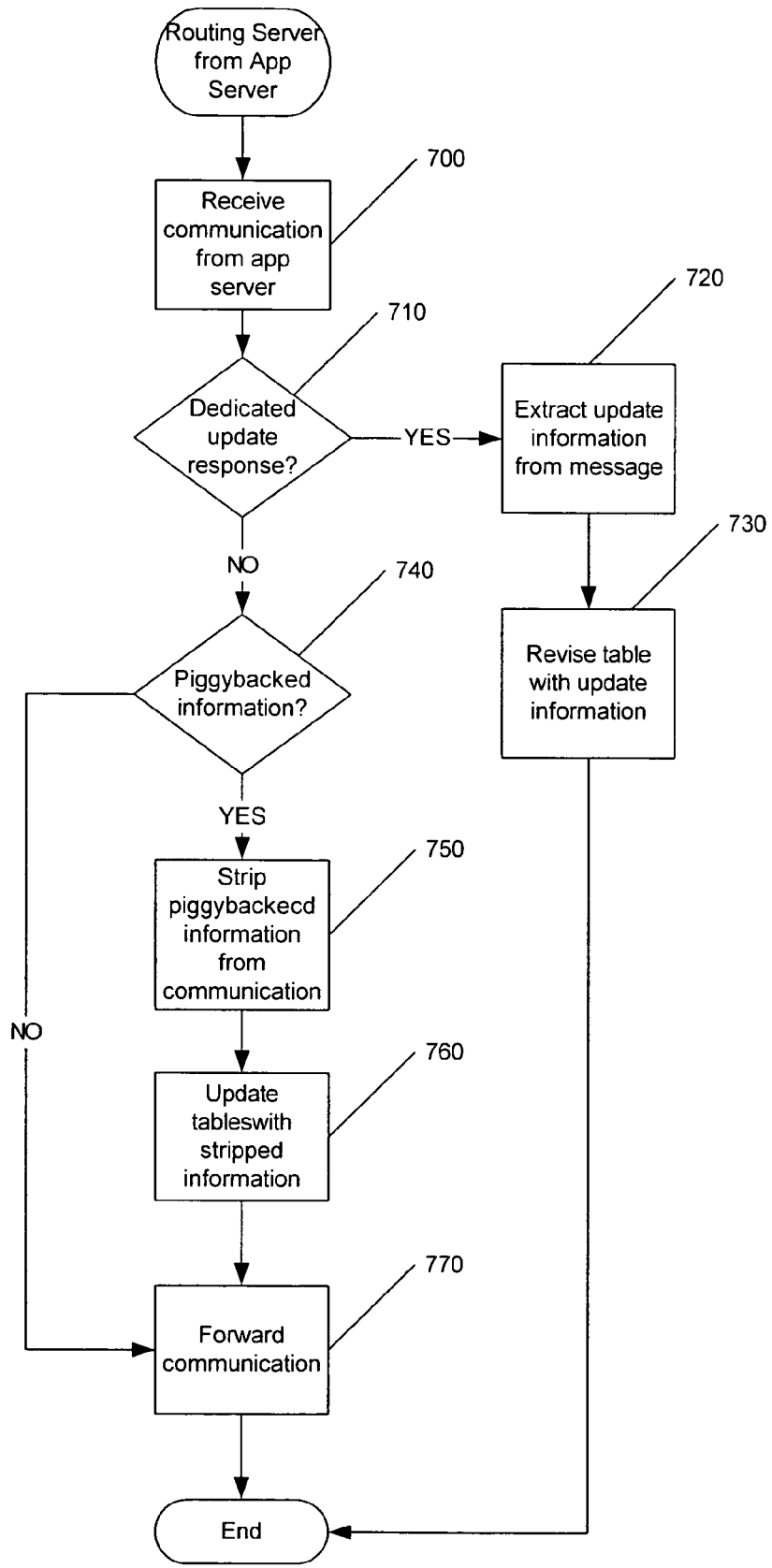

FIG. 7 illustrates operations of a HTTP routing server, such as HTTP routing servers 12 and 12' of FIG. 1 or 60 of FIG. 3, according to some embodiments of the present invention when a communication is received from an application server, such as one of application servers 20, 20' or 20" of FIG. 1 or 80 of FIG. 4. As seen in FIG. 7, the HTTP routing server receives a communication from an application server (block 700) and determines if the communication is a table update communication that is received in a dedicate response to a request for an table update (block 710). If the communication is a dedicated table update communication, the HTTP routing server extracts the partition to server mapping table information from the communication (block 720) and updates its partition to server mapping table (block 730). Operations with respect to the received communication are then complete.

The particular mechanism for updating the partition to server mapping table may depend on the format of the table information of the update message. For example, if the application servers each include a complete copy of the partition to server mapping table, then the table may be replaced with the new table. Alternatively, the update message may contain only changed data such that an existing partition to server mapping table is updated with new data, either to change existing entries or to add new entries. Furthermore, a combination of the two techniques could be used where the type of information is specified as either a table replace or an entry update. The extent of the table information provided by the application servers could also be specified by the HTTP routing servers. For example, an initializing HTTP routing server could request and receive a complete table whereas an operational HTTP routing server could request and receive only updates.

Returning to FIG. 7, if the communication is not a table update communication (block 710), the HTTP routing server determines if there is information associated with the partition to server mapping piggybacked on the received communication (block 740). Such a determination may be made, for example, by interrogating cookies contained in the communication to detect the presence of partition to server mapping table information. If partition to server mapping table information is contained in the communication (block 740), the partition to server mapping table information is stripped from the communication (block 750) and the partition to server mapping table updated with the stripped information (block 760). The update of the partition to server mapping table may be provided as discussed above. The communication with the update information stripped from the communication is then forwarded by the HTTP routing server to the destination specified by the communication (block 770). Operations with respect to the received communication are then complete.

If partition to server mapping table information is not contained in the communication (block 740), the communication is forwarded by the HTTP routing server to the destination specified by the communication (block 770). Operations with respect to the received communication are then complete.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claims is:

1. A method of maintaining session state affinity in a workload balancing system comprising at least one hypertext transfer protocol (HTTP) routing server and a plurality of application servers comprising:
    maintaining backup session state information for a first session between a user and a first application server of the plurality of application servers, wherein:
        the backup session state information is maintained at a designated one application server or a subset of less than all of the plurality of applications servers, different from the first application server; and
        each one of the plurality of application servers is executed on an associated data processing system;
    detecting the unavailability of the first application server by at least one of the plurality of application servers other than the first application server;
    determining a second application server of the plurality of application servers that continues the first session by;
        preparing by a particular one of the plurality of application servers, a response that is routed to a selected HTTP routing server executed on an associated data processing system, where the response is associated with a second session that is different from the first session;
        identifying the second application server designated to take over the first session and the first session by the particular one of the plurality of application servers responsive to detecting the unavailability of the first application server;
        incorporating the identification of the second application server and the first session in the response associated with a second session prepared by the particular one of the plurality of application servers; and
    sending the response associated with the second session to the selected HTTP routing server; wherein:
        the identification of the second application server and the first session are received at the selected HTTP routing server by stripping the identification of the second server from the response associated with the second session;
        the response associated with the second session, which has been stripped of the identification of the second application server and the first session, is forwarded by the selected HTTP routing server to its recipient; and
        selected HTTP routing server is reconfigured to route communications associated with the first session to the second application server responsive to receiving the identification of the second application server so that backup session state information maintained at the second application server is used to continue the first session from the first application server at the second application server.

2. The method of claim 1, further comprising requesting by each HTTP routing server, an identification of associations of servers and sessions from the plurality of application servers; and
    sending an identification of associations of servers and sessions from the application servers to each HTTP routing server responsive to the request from the requesting HTTP routing server.

3. The method of claim 2, further comprising determining if an identification of associations of servers and sessions at each HTTP routing server is out of date, wherein the HTTP routing server requesting an identification is responsive to the determination that the identification of associations of servers and sessions at the HTTP routing server is out of date.

4. The method of claim 2, wherein the identification of associations of servers and sessions comprises a partition to server mapping table maintained by each HTTP routing server.

5. The method of claim 1, wherein sending an identification of the second server and the first session from the other application server of the plurality of application servers to the selected HTTP routing server responsive to detecting the unavailability of the first server comprises:
    detecting a change in partition to server mapping information maintained at the other application server; and
    sending the identification of the second server and the first session to the HTTP routing server responsive to detecting the change in the partition to server mapping information.

* * * * *